United States Patent [19]

Hojoh

[11] Patent Number: 4,741,213
[45] Date of Patent: May 3, 1988

[54] QUARTZ-TYPE GAS PRESSURE GAUGE

[75] Inventor: Hiso Hojoh, Tokyo, Japan

[73] Assignee: Seiko Instruments & Electronics Ltd., Tokyo, Japan

[21] Appl. No.: 12,355

[22] Filed: Feb. 9, 1987

[30] Foreign Application Priority Data

Feb. 7, 1986 [JP] Japan ................................. 61-25392

[51] Int. Cl.⁴ ........................ G01L 11/00; H01L 41/04
[52] U.S. Cl. ........................................ 73/702; 73/384; 310/361; 310/370
[58] Field of Search ................. 73/702, 384, 386, 387, 73/754; 374/117; 310/370, 361

[56] References Cited

U.S. PATENT DOCUMENTS 4,638,664  1/1987  Tamura ................................. 73/702

Primary Examiner—Donald O. Woodiel
Attorney, Agent, or Firm—Bruce L. Adams; Van C. Wilks

[57] ABSTRACT

The present invention deals with a quartz-type gas pressure gauge which utilizes resonance of a quartz vibrator that changes depending upon the pressure, wherein the quartz vibrator is of the type of tuning fork obtained from a Z-plate of quartz crystal that is cut at an angle of greater than 1°50' with respect to the Y-axis, in order to prevent the occurrence of erroneous measurement that will be caused by the change of ambient temperature particularly in low pressure regions.

1 Claim, 4 Drawing Sheets

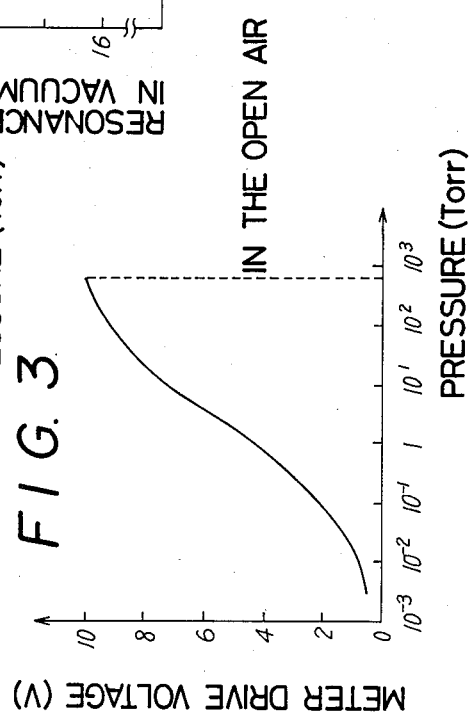
FIG. 4
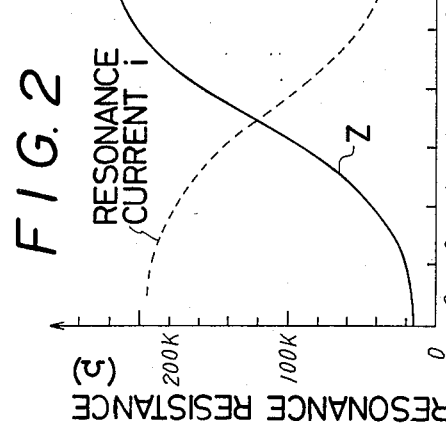
FIG. 2
FIG. 3

QUARTZ-TYPE GAS PRESSURE GAUGE

BACKGROUND OF THE INVENTION

The present invention relates to a gas pressure gauge which measures the pressure of a gas by using a quartz vibrator.

A quartz-type gas pressure gauge has heretofore been known in which a single sensor is capable of measuring the gas pressure of from atmospheric pressure through up to $10^{-3}$ Torr. That is, since it was found that resonance resistance of a quartz vibrator exhibits dependency upon the pressure of ambient atmosphere over a wide range, gas pressure gauges have been developed in which a single sensor measures the pressure of from atmospheric pressure through up to $10^{-3}$ Torr by utilizing the above-mentioned phenomenon. This has been disclosed in, for example, "Keiso" (Development of a very small Vacuum Sensor using a Quartz Vibrator), Vol. 27, No. 7, 1984.

In the quartz-type gas pressure gauge of the above-mentioned conventional structure which utilizes the resonance resistance of a quartz vibrator that changes depending upon the pressure, however, the resonance resistance of quartz vibrator greatly changes in a low pressure region of $10^{-3}$ to about $10^{-2}$ Torr, making it difficult to take measurement maintaining precision.

FIG. 4 illustrates temperature characteristics of resonance resistance of a conventional quartz vibrator. In vacuum, the resonance resistance greatly changes with the change in the temperature, i.e., the resonance resistance increases with the increase in the temperature. In the open air, on the other hand, the resonance resistance is mostly affected by friction with the air, and does not greatly change even when the temperature is changed. According to the conventional technique, therefore, the resonance resistance is seriously affected by the temperature as the gas pressure decreases, and error develops in the measurement.

It is an object of the invention to provide a quartz-type gas pressure gauge having a resonance varies little depending upon the temperature under low pressure conditions, making it possible to obtain meanurement maintaining increased precision under low-pressure condition.

Other and further objects, features and advantages of the invention will appear more fully from the following description.

BRIEF DESCRIPTION OF THE DRAWINGS

FIG. 2 is a diagram showing gas pressure vs. resonance resistance, resonance current characteristics of a quartz vibrator;

FIG. 3 is a diagram showing meter drive voltage vs. gas pressure characteristics;

FIG. 4 is a diagram of temperature characteristics of resonance resistance of a conventional quartz vibrator;

DETAILED DESCRIPTION OF PREFERRED EMBODIMENTS

The present invention is concerned with a quartz-type gas pressure gauge which utilizes the fact that the quartz vibrator exhibits resonance resistance that changes depending upon the pressure of ambient gas under the condition where the quartz vibrator is stably vibrated at resonance frequency in a phase locked loop circuit (hereinafter referred to as PLL circuit), the quartz vibrator being of the type of a tuning fork obtained from a Z-plate of quartz crystal and being cut at an angle of greater than 1°50' with respect to the Y-axis.

The quartz vibrator of the type of tuning fork obtained from a Z-plate of quartz crystal which is cut at an angle of greater 1°50' with respect to the Y-axis, exhibits parabolic temperature-resonance resistance characteristics, the peak thereof lying near ordinary temperature at which the gauge is used and the parabola opening broadly. Therefore, the temperature-resonance resistance characteristics are nearly flat in the temperature regions where the gauge is used, and are not much affected by the change in the ambient temperature.

(Embodiment)

An embodiment of the invention will be described below in detail in conjunction with the drawings.

FIG. 2 is a diagram illustrating a relationship between the pressure of a gas and the resonance resistance and the resonance current of a quartz vibrator according to the present invention. The quartz vibrator exhibits resonance resistance from the atmospheric pressure through up to $10^{-3}$ Torr. If this quartz vibrator is driven at a constant voltage, there is obtained a resonance current - gas pressure curve that is represented by i in FIG. 2. Like the above-mentioned resonance resistance, the resonance current exhibits sensitivity for the gas pressure from the atmospheric pressure through up to $10^{-3}$ Torr. From the standpoint of easily taking measurement, therefore, it is better to measure the resonance current or the resonance voltage than to measure the resonance resistance.

Figure 1:
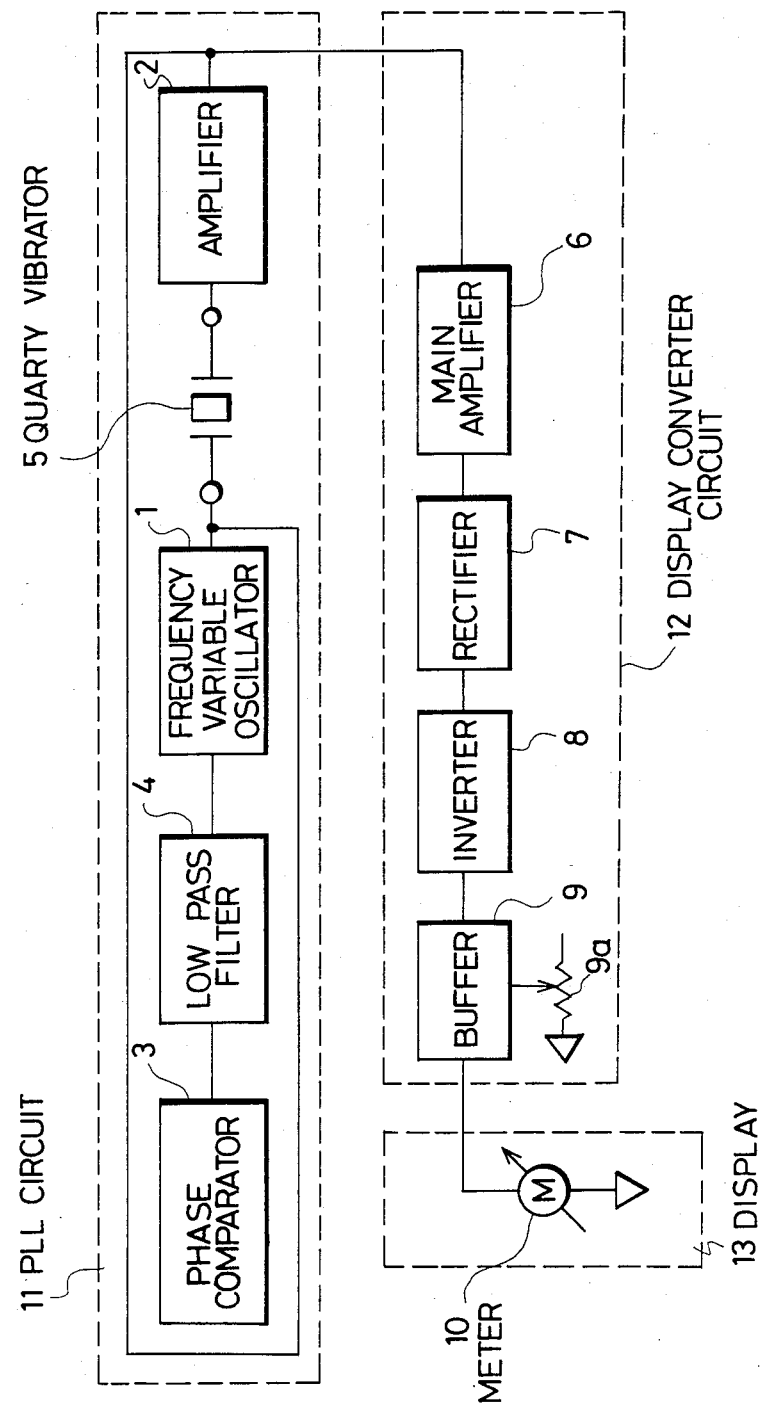
FIG. 1 is a block diagram of a circuit of a quartz-type gas pressure gauge.

FIG. 1 is a block diagram of a circuit of a quartz-type gas pressure gauge contemplated by the present invention. Roughly, the pressure gauge consists of a PLL circuit 11, a display converter circuit 12, and a display unit 13. The PLL circuit 11 consists of a frequency variable oscillator 1 which is controlled by a current or a voltage, an amplifier 2 which performs the amplification with the resonance current of the quartz vibrator 5 as a voltage, a phase comparator 3 which compares the phase of an output signal of the amplifier 2 with the phase of an output signal of the frequency variable oscillator 1, and a low-pass filter 4 which converts pulse-like output signals of the phase comparator 3 into a d-c voltage. The output voltage of the low-pass filter 4 controls the oscillation frequency of the frequency variable oscillator 1. The quartz vibrator 5 which is a pressure sensor is connected to the output terminal of the frequency variable oscillator 1 and to the input terminal of the amplifier 2.

Operation principle of the PLL circuit 11 has been widely known and is not described here. The oscillation frequency of the frequency variable oscillator 1 has been controlled at all times so that the phase difference becomes zero between the output signal of the frequency variable oscillator 1, i.e., the drive voltage of the quartz vibrator 5 and the output signal of the amplifier 2, i.e., the current that flows through the quartz vibrator 5. That is, the quartz vibrator 5 is driven at its own resonance frequency at all times, presenting a significant meaning from the standpoint of putting the quartz-type gas pressure gauge into practice. This is because, the resonance frequency of the quartz vibrator is subject to change depending upon the pressure of the surrounding gas.

Next, the display converter circuit 11 consists of a main amplifier 6 which further amplifies the signal of the amplifier 2, a rectifier 7 which rectifies the output signals of the main amplifier 6 into a direct current, an inverter 8 which inverts the polarity of output voltage of the rectifier 7, and a buffer 9 which applies a bias to the output voltage of the inverter 8. The amount of bias can be arbitrarily changed by a variable resistor 9a.

The display unit 13 displays the pressure of a gas in a digital or in an analog manner, and is comprised of a meter 10 in this embodiment, so that the pressure of gas can be read from the deflecting angle of the meter 10.

The pressure characteristics of resonance current of the quartz vibrator are shown in FIG. 2; i.e., the resonance current increases with the decrease in the pressure of ambient gas. Therefore, if the resonance current is amplified as a voltage and is rectified into a direct current to drive the meter 10, the deflecting angle of the meter 10 increases with the decrease in the pressure to make an indication that is contrary to common sense. A meter drive voltage shown in FIG. 3 can be obtained by inverting the polarity of the d-c voltage by the inverter 8 and by applying a bias voltage by the buffer 9. In the example of FIG. 3, the amount of bias is so adjusted that the meter drive voltage will be 10 volts under atmospheric pressure. Thus, and ordinary pressure indication can be obtained in which the needle of the meter is perfectly deflected under the atmospheric pressure, and the deflecting angle of the meter decreases with the decrease in the pressure.

Figure 5:
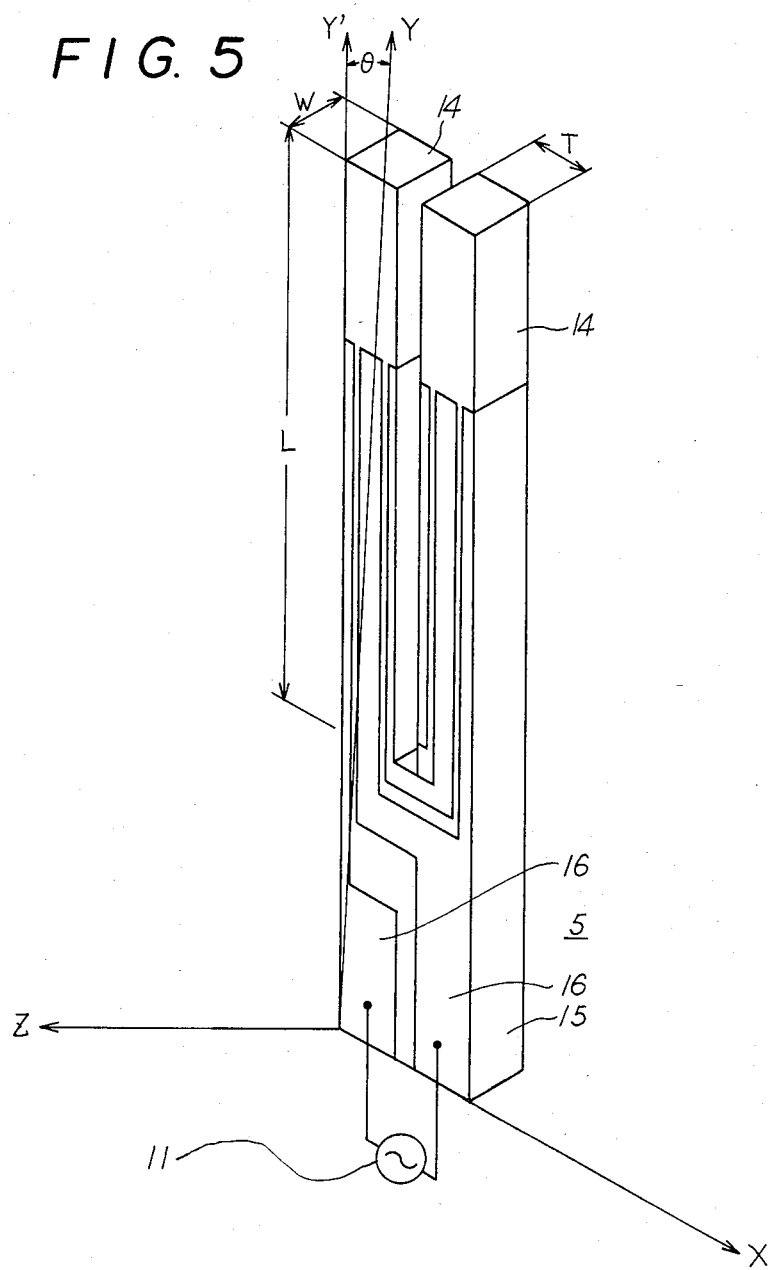
FIG. 5 is a perspective view of a tuning fork-type quartz vibrator.

FIG. 5 is a perspective view of a quartz vibrator 5 employed in the present invention. The quartz vibrator 5 is of the type of a tuning fork which consists of two arms and a leg 15 which supports them. On the surface are arranged a pair of electrodes (Au/Cr double-layer structure) 16. The PLL circuit 11 is connected to both ends of the electrodes. Arms of the tuning fork may have a length L of 10 mm, a width T of 3.25 mm and a thickness W of 130μ. The sizes, however, need not be limited to these values only.

What is important is a cutting angle as will be described below. That is, in FIG. 5, the Z-axis is an optical axis that passes through a vertex of the quartz crystal. The X-axis exists on a plane perpendicular to the Z-axis, and extends toward a vertex of the hexagonal pole of quartz crystal. Therefore, there are three X-axes that are separated apart by 120°. The Y-axis is on a plane perpendicular to the Z-axis, and intersects the X-axis at right angles.

The angle of cutting the tuning fork-type quartz vibrator (i.e., the azimuth of cutting the crystal) used in the present invention is as shown in FIG. 5. Namely, the tuning fork is cut out from a flat plate (i.e., Z-plane) that is defined by the X-axis and by the Y'-axis which is given by turning the Y-axis in the counterclockwise direction by $\theta$ with the X-axis as an axis of rotation.

Figure 6:
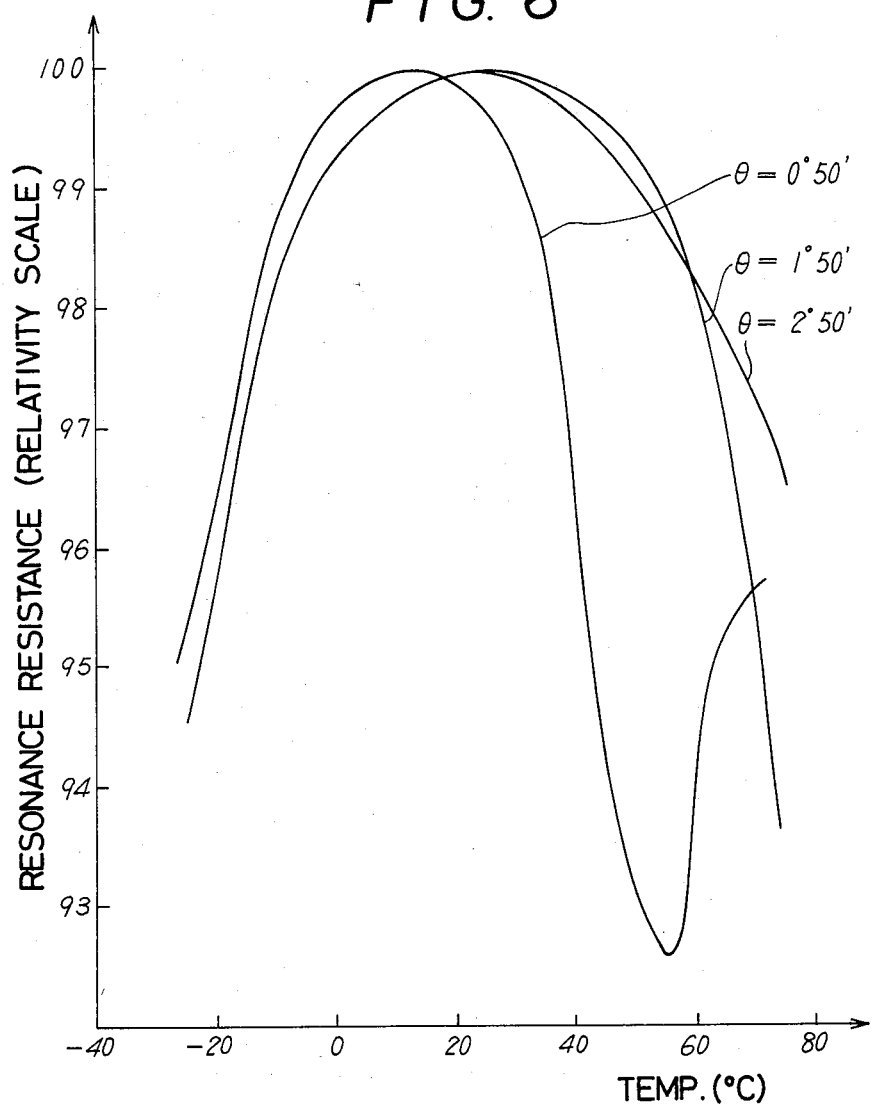
FIG. 6 is a diagram of resonance resistance vs. temperature characteristics of tuning fork-type quartz vibrators with cutting angles as parameters.

FIG. 6 illustrates temperature - resonance resistance characteristics of tuning fork-type quartz vibrators that are cut at some different angles $\theta$ under low-pressure conditions. The resonance resistance of ordinate is a relative memory of when a peak value is set at 100. When the cutting angle is $\theta = 0°50'$, a peak value of parabola is exhibited at 15° C., the parabola opening in a small amount. Therefore, flat characteristics are not exhibited near ordinary temperature (25° C.) which lies in a range where the pressure gauge is used. As the cutting angle is increased to $\theta = 1°50'$ and $\theta = 2°50'$, the peak value shifts to near 30° C. which approaches normal temperature of a range where the pressure gauge is used. Further, the parabola opens wide, and resonance resistance characteristics become flat near ordinary temperature. In this respect, there is not difference between the case of $\theta = 1°50'$ and the case of $\theta = 2°50'$. Therefore, if use is made of the tuning fork-type quartz vibrator which is cut at an angle of greater than $\theta = 1°50'$, there is obtained a gas pressure gauge of which the resonance resistance varies little depending upon the temperature under low pressure conditions.

According to the gas pressure gauge which utilizes the resonance resistance of a quartz vibrator that changes depending upon the pressure of the surrounding gas of the present invention, use is made of a tuning fork-type quartz vibrator that is cut at an angle of greater then 1°50'. Namely, there is obtained a gas pressure gauge of which the resonance resistance varies little depending upon the temperature under low pressure conditions, making it possible to obtain measurement maintaining increased precision under low-pressure conditions.

What is claimed is:
1. In a quartz-type gas pressure gauge comprising:
 a phase locked loop circuit which consists of at least a frequency variable oscillator, a phase comparator, a low-pass filter and an amplifier;
 a quartz vibrator connected to said frequency variable oscillator;
 a display converter circuit connected to said phase locked loop circuit; and
 a display unit connected to said display converter circuit;
 wherein the pressure of a gas surrounding said quartz vibrator is measured relying upon a resonance resistance of said quartz vibrator, or a resonance current of said quartz vibrator or a resonance voltage of said quartz vibrator, and wherein said quartz vibrator is of the type of a tuning fork obtained from a Z-plate which is cut at an angle of +1°50' or larger with respect to the Y-axis.

* * * * *